United States Patent
Isakov et al.

(10) Patent No.: US 7,730,458 B2
(45) Date of Patent: Jun. 1, 2010

(54) BUILT-IN DIAGNOSTICS

(75) Inventors: Konstantin Isakov, Redmond, WA (US); Dax Hawkins, Kirkland, WA (US); Pablo Castro, Bellevue, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1060 days.

(21) Appl. No.: 10/830,604

(22) Filed: Apr. 23, 2004

(65) Prior Publication Data

US 2005/0240904 A1 Oct. 27, 2005

(51) Int. Cl.
*G06F 9/44* (2006.01)

(52) U.S. Cl. .................. 717/128; 717/130

(58) Field of Classification Search .......... 717/124–135
See application file for complete search history.

(56) References Cited

U.S. PATENT DOCUMENTS

| | | | |
|---|---|---|---|
| 6,139,198 A | 10/2000 | Danforth et al. | |
| 6,434,739 B1 | 8/2002 | Branson et al. | |
| 6,513,152 B1 | 1/2003 | Branson et al. | |
| 6,681,344 B1 | 1/2004 | Andrew | |
| 7,058,928 B2 * | 6/2006 | Wygodny et al. | 717/128 |
| 2002/0199172 A1 * | 12/2002 | Bunnell | 717/128 |

OTHER PUBLICATIONS

IBM, "AIX Version 4.3 Kernel Extensions and Device Support Programming Concepts", 1997, IBM Corporation, pp. 1-147.*
R. Sosic. The Dynascope Directing Server: Design and Implementation. USENIX Association, Computing Systems, vol. 8 Issue 2, 1995. 20 pages.
Philip W. L. Fong. Pluggable Verification Modules: An Extensible Protection Mechanism for the JVM. To appear in Proceedings of the 19th ACM SIGPLAN Conference on Object-Oriented Programming, Systems, Languages, and Applications, 2004. 24 pages.
Tina Low. Designing, Modelling, and Implementing a Toolkit for Aspect-Oriented Tracing. 1st International Conference on Aspect-Oriented Software Development, 2002. 5 pages.
Advanced Troubleshooting with IIS Tracing (IIS 6.0), Microsoft Tech Net, http://www.microsoft.com/technet/prodtechnol/WindowsServer2003/Library/IIS/592e2b3e-02d5-4b37-b0dc-a728e0636974.mspx, 1 page, retrieved on Jun. 20, 2005.

* cited by examiner

*Primary Examiner*—Ted T Vo
(74) *Attorney, Agent, or Firm*—Workman Nydegger

(57) ABSTRACT

A system and method facilitating diagnostics support is provided. The system includes application(s) instrumented in accordance with a built-in diagnostics (BID) framework, and, trace component(s). The trace component can selectively employ none, some and/or substantially all of the trace point(s) associated with the application. The system can facilitate instrumentation of a managed data access stack, for example, to enhance supportability of the application.

14 Claims, 5 Drawing Sheets

BUILT-IN DIAGNOSTICS

BACKGROUND OF THE INVENTION

1. Technical Field

The present invention relates generally to computer system(s), and, more particularly, to computer system(s) employing built-in diagnostics.

2. Description of the Related Art

As computers and computer applications have become more complicated, the opportunities for computer users to encounter difficulties with their computers have increased. Diagnosing problem(s) has historically been difficult due to incomprehensible, incomplete and/or inaccurate data available from which to make a diagnosis.

Many component developers have included varying levels of tracing in their code using statements such as: TRACE, ATLTRACE, IRTLTRACE, LOGTRACE, LTRACE, OCI_TRACE, TraceParam, TraceLog, TraceHRESULT, bcpLog etc. However, historically tracing has been implemented independently and without cooperation between and/or amongst component developers. As such, investigation of computer problem(s) has proven a difficult task.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods facilitating diagnostics support. The system includes application(s) instrumented in accordance with a built-in diagnostics (BID) framework, and, trace component(s). The trace component can selectively employ none, some and/or substantially all of the trace point(s) associated with the application. The system can facilitate instrumentation of a managed data access stack, for example, to enhance supportability of the application.

The BID framework is a general purpose instrumentation framework that enables trace-point(s) to be embedded into a code base (e.g., by the development team). The instrumentation thus comprises of a set of calls added throughout the code to notify trace component(s) (e.g., tracing library) of component activity(ies) associated with the application. The BID framework thus provides the means to include trace-points in code and to bind the instrumented binaries to trace component(s) (e.g., trace-library) dynamically (e.g., based on configuration).

The BID framework also defines the binary protocol for trace component(s) (e.g., trace-library(ies)) to be hooked into the component(s) to be traced. The trace component(s) can accordingly be viewed as "pluggable" since the application instrumented to support BID can be employed with any suitable trace component(s).

In accordance with an aspect of the present invention, the BID framework provides application program interface(s) (APIs) that enables developer(s) place the actual trace-points. For example, these APIs can be available for both native (e.g., unmanaged) and/or managed code, in the form of macro(s) and class(es), respectively. The trace-point(s) indicate, for example, when to trace and/or what to trace (e.g., function entry/exit, parameters, internal activity, resource allocation), as well as general purpose control information. In this example, the trace-point(s) do not generally include information on how to trace (e.g., no tracing-facility-specific information is embedded in the code).

In accordance with another aspect of the present invention, the BID framework is designed so the overhead built into the code by the trace-point(s) is minimized. Thus, post-filtering and/or processing is generally performed by the trace component(s) (e.g., actual tracing library being used). For example, the trace component(s) can selectively perform post-filtering and/or processing based, for example, upon goal(s) of the trace component(s) (e.g., performance versus richness).

In accordance with yet another aspect of the present invention, the BID framework can further include an infrastructure to dynamically load trace component(s) (e.g., trace library(ies)) based, for example, upon configuration information. The trace component(s) (e.g., trace library(ies)) include the actual tracing code, or glue code to bridge to an external tracing facility (not shown) (e.g., bridge to Event Tracing).

In accordance with another aspect of the present invention, the design of the BID framework facilitates a number of optimizations to pre-process the trace-points contained in a given binary to selectively enable/disable individual trace-points, and/or to strip out the trace-point text information from the binary.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
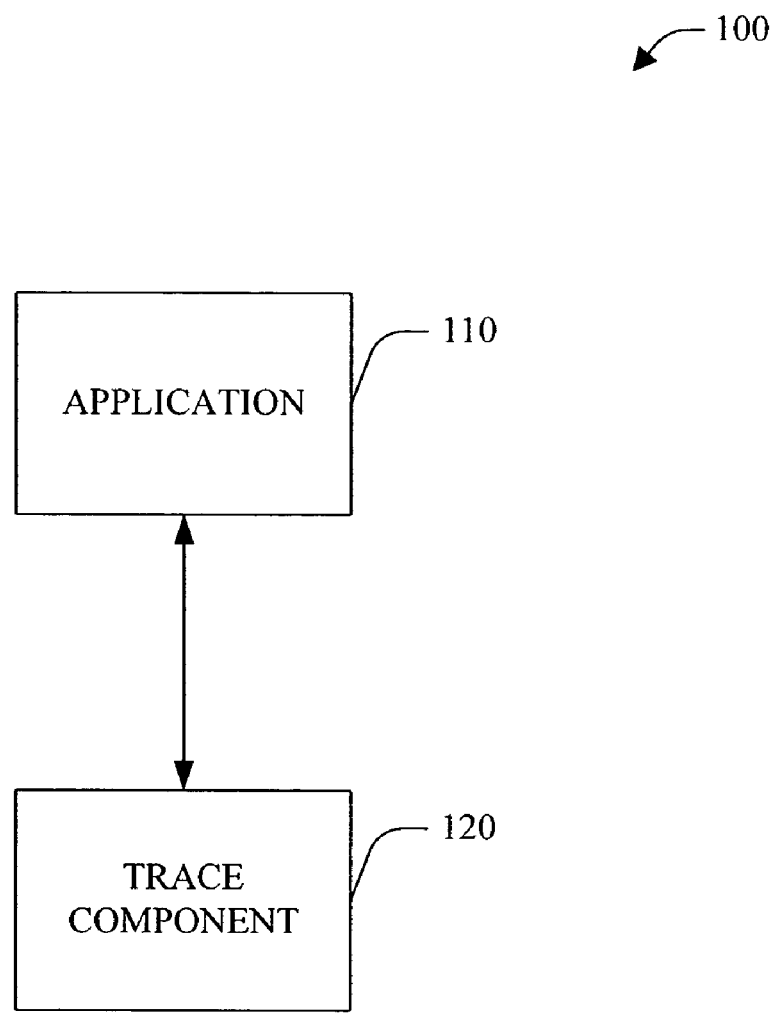
FIG. 1 is a block diagram of a diagnostic support system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution.

For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a diagnostic support system 100 in accordance with an aspect of the present invention is illustrated. The system 100 includes an application 110 instrumented in accordance with a built-in diagnostics (BID) framework. The system can facilitate instrumentation of a management data access stack, for example, to enhance supportability of the application 110.

For example, functional groups of customers that can benefit from this diagnostics facility include:

Product Support Services Engineers who need to investigate customer's problems;

Administrators of large websites who use diagnostic software based on Event Tracing to monitor their Data Centers;

Developers of third party drivers and providers;

Developers of Web Data applications who need to better understand how their code interacts with other components;

Developers of Web Services whose components tightly work with other components;

Developers of components at development phase;

Testers at stabilization phase and during component's life time (for example, Regression Test Harness can provide its own implementation of the tracing subsystem and efficiently use internal diagnostics, turning "Black-Box" testing to "White-Box" testing);

Authors of other software who want to enable consistent software diagnostics in their products.

The BID framework is a general purpose instrumentation framework that enables trace-point(s) to be embedded into a code base (e.g., by the development team). The instrumentation thus comprises of a set of calls added throughout the code to notify trace component(s) 120 (e.g., tracing library) of component activity(ies) associated with the application 110. The BID framework thus provides the means to include trace-points in code and to bind the instrumented binaries to trace component(s) 120 (e.g., trace-library) dynamically (e.g., based on configuration).

The BID framework also defines the binary protocol for trace component(s) 120 (e.g., trace-library(ies)) to be hooked into the component(s) to be traced. The trace component(s) 120 can accordingly be viewed as "pluggable" since the application 110 instrumented to support BID can be employed with any suitable trace component(s) 120.

In one example, the BID framework provides application program interface(s) (APIs) that enables developer(s) place the actual trace-points. For example, these APIs can be available for both native (e.g., unmanaged) and/or managed code, in the form of macro(s) and class(es), respectively. The trace-point(s) indicate, for example, when to trace and/or what to trace (e.g., function entry/exit, parameters, internal activity, resource allocation), as well as general purpose control information. In this example, the trace-point(s) do not generally include information on how to trace (e.g., no tracing-facility-specific information is embedded in the code.) Additionally and/or alternatively, BID APIs can further facilitate tracing of software assertion(s), resource/performance monitoring, programmatic control for trace component(s) 120 and/or object instance tracking identifier(s).

The BID framework is designed so the overhead built into the code by the trace-point(s) is minimized. Thus, post-filtering and/or processing is generally performed by the trace component(s) 120 (e.g., actual tracing library being used). For example, the trace component(s) 120 can selectively perform post-filtering and/or processing based, for example, upon goal(s) of the trace component(s) 120 (e.g., performance versus richness).

In another example, the BID framework can further include an infrastructure to dynamically load trace component(s) 120 (e.g., trace library(ies)) based, for example, upon configuration information. The trace component(s) 120 (e.g., trace library(ies)) include the actual tracing code, or glue code to bridge to an external tracing facility (not shown) (e.g., bridge to Event Tracing for Windows® (ETW)).

In yet a third example, the design of the BID framework facilitates a number of optimizations to pre-process the trace-points contained in a given binary to selectively enable/disable individual trace-points, and/or to strip out the trace-point text information from the binary.

The system 100 further includes a trace component 120 that can selectively employ none, some and/or substantially all of the trace point(s) associated with the application 110.

BID General Purpose Instrumentation Framework

As noted previously, the BID framework is a general purpose instrumentation framework that enables trace-point(s) to be embedded into a code base (e.g., by the development team). The BID framework can allows component(s) to expose information (e.g., state and/or behavior) that can be selectively enabled and disabled. For example, the trace-point(s) can be granular and specific since the trace component(s) 120 can selectively enable or disable individual trace-point(s) and/or set(s) of trace-point(s).

Trace-Points

Trace point(s) can be added to code (e.g., in proper places, for example, as determined by a developer). In one example, the general criterion is that all major functions should trace their own "scope" (e.g., entrance and/or exit trace point(s)). In another example, substantially all exception(s), error(s), warning(s) and/or layer transition(s) (e.g., SqlClient→SNI, OracleClient→OCI) can be traced as well. Optionally, other non-obvious activity can also be included in the trace, such as a provider opening a second connection (e.g., hidden).

In one example, access to the trace component(s) 120 is facilitated by two "include" statements. The first references header information and the second references dynamic binding code. These references facilitate access into the component(s) (e.g., application(s)) by the trace component(s) 120.

Generally, a kind of trace point has a specific format. Exemplary specific formats are described below.

Printf-like Syntax

In accordance with an aspect of the present invention, a format string for a BID framework trace-point follows the "printf" style format string (e.g., compatible with C runtime version 7.0 and above). Thus, in this example, the "I" size modifier introduced in Visual C++ can be employed:

TABLE 1

```
INT_PTR iptr;
UINT_PTR uptr;
BidTrace2A("%Id %Iu\n", iptr, uptr);
```

In this example, other "printf" format specification(s) include, for example,
For pointers/references, % p (e.g., not % 08×(32/64 bit));
For HRESULT, % 08×(e.g., 32 bit);
For BOOL and bool, % d;
Use explicit string "width" modifiers % hs and % ls;
For strings, explicitly add quotes, for example, use '% s'.

TABLE 2

In another example, the following extensions were made to the printf-style syntax:

TABLE 3

| Symbol | Meaning |
|---|---|
| %d# | The # symbol denotes that this value is not a regular integer, but actually an ObjectID. |
| %d{alias.EnumName} | Indicates that the integer is actually an enum. "alias.EnuName" denotes the type-name of the enum, including either the full namespace or the alias. |

The printf syntax is employed in this example, at least in part, as printf-style formatting is well known and a proven way to describe data that should be delivered to some (usually text) output stream. Thus, in this example, the BID functionality is able to benefit from this well known and proven description method by using the same format string not for text formatting, but for discovering the stack frame with the list of parameters, which the compiler has put together in order to make a function call.

Figure 2:
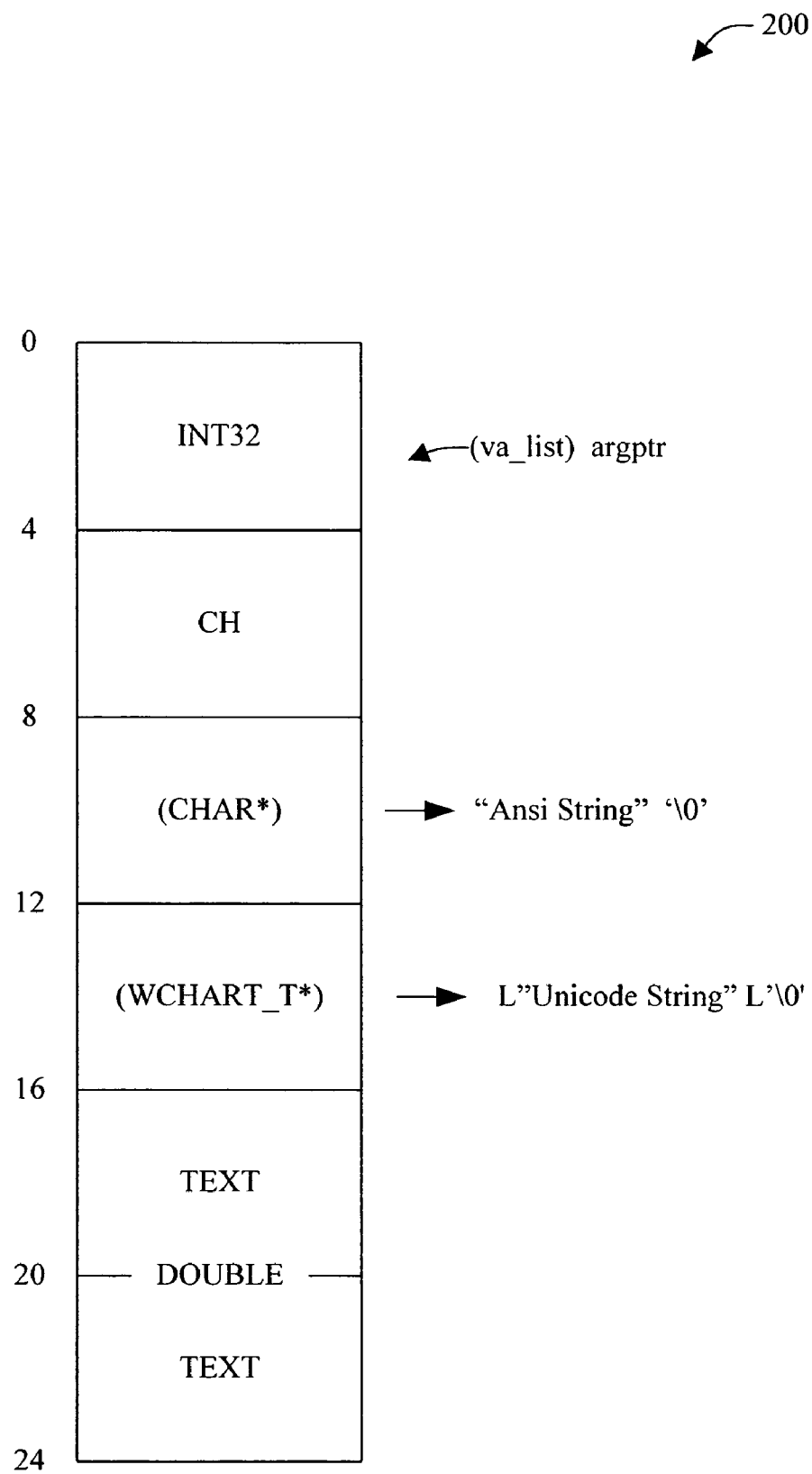
FIG. 2 is a block diagram of an exemplary stack frame in accordance with an aspect of the present invention.

Referring to FIG. 2, an exemplary stack frame 200 in accordance with an aspect of the present invention is illustrated. The Assuming 32 bit code, he stack frame 200 is based on the following statement:

TABLE 4

```
vprintf("%d %c %hs %ls %f", argptr)
```

In this example, the parameters are passed by value, so only the address (e.g., argptr) and the size of that stack frame are needed to flush the arguments at once to a binary pipe, for example, An exception is text strings, actually pointers to text strings, in which the string's body is needed and not just its current address in memory. Fortunately format string contains the necessary information to properly handle this case.

Special Allocation for Text Strings

In one example, a degradation of performance associated with trace information associated with text descriptor(s) is significant. String manipulations at run-time are generally less efficient than operations with integer variables. However, in this example, the text string(s) are processed in advanced in order to yield comparable performance while continuing to reap the benefit of power and flexibility of the text descriptors.
For example:

TABLE 5

```
{
   // Here is a little bit tricky way to multiply 37 * 10
   int var, sum = 0;
   for( int i = 0; i < 10; i++ )
   {
      Roman2Int( "XXXVII", &var );
      sum += var;
   }
}
void Roman2Int( PCSTR str, int* pRetVal )
{
   // Every time exactly the same string is received and the same result
   // returned
   // But we can do nothing about it
   *pRetVal = rom2i(str);
}
```

Table 5 illustrates a standard way to deal with text arguments.
Next, referring to Table 6, a static pointer can be employed instead of a direct address of that string:

TABLE 6

```
{
   int var, sum = 0;
   // Special Preprocessing
   static PCSTR localPtr = "XXXVII";
   Roman2Int( localPtr, &var );
   localPtr = (PCSTR)(-var);        // Negative value helps
distinguish integers and pointers
   // Original code
   for( int i = 0; i < 10; i++ )
   {
      Roman2Int( localPtr, &var ); // Now it works way faster!
      sum += var;
   }
}
void Roman2Int( PCSTR str, int* pRetVal )
{
   if( (int)str < 0 )
   {
      *pRetVal = -((int)str);// very fast integer operation
   }
   else
   {
      *pRetVal = rom2i(str);          // no magic, just
regular processing
   }
}
```

In this example, the C/C++ pre-processor can help hide the trick with static pointer, so the function call would look obvious:

TABLE 7

```
#define ROMAN_2_INT(str,var)          \
{  static PCSTR localPtr = str;  \
   Roman2Int(localPtr, var);        \
}
// Original code
for( int i = 0; i < 10; i++ )
{
   ROMAN_2_INT( "XXXVII", &var );
   sum += var;
}
// Will be expanded as
```

TABLE 7-continued

```
        for( int i = 0; i < 10; i++ )
        {
            {   static PCSTR localPtr = "XXXVII";
                Roman2Int( localPtr, &var );
            };
            sum += var;
        }
```

In accordance with an aspect of the present invention, access to these local static pointer(s) is obtained in order to facilitate processing of the strings and replacement of the pointers with integers in advance (e.g., pre-processing). For example, the special local static pointers are collected in one place to organize an access table which can be scanned at load time.

In one example, a pre-processor obtains the string table from the binary (e.g., which is put in a dedicated segment in the portable executable file (PE file)). Thereafter, based, for example, upon user setting(s) for filtering, the pre-processor performs a one-time scan of the entire string table, replacing values stored in the string table with indicators (e.g., "special integers") that indicate whether each particular trace-point should be used or not.

In another example, this organization technique is facilitated by the linker. The linker generally merges segments of object file to the corresponding section of executable file in alphabetic order. This means that if variable start is allocated in segment seg$1 and variable stop is allocated in segment seg$3, then the linker puts all variables allocated in segment seg$2 right between variables start and stop:

TABLE 8

```
#define ROMAN_2_INT(str,var)                                    \
    {   __declspec(allocate("seg$2")) static PCSTR localPtr = str; \
        Roman2Int(localPtr, var);                                \
    }
void Foo( )
{
    ROMAN_2_INT( "XXXVII", &var );      sum += var;
    ROMAN_2_INT( "XXI", &var );         sum += var;
    // .. .. ..
}
void main( )
{
    __declspec(allocate("seg$1")) static PCSTR start = NULL;
    __declspec(allocate("seg$3")) static PCSTR stop = NULL;
    PCSTR* pStart = &start;
    PCSTR* pStop = &stop;
    while( ++pStart < pStop )
    {
        Roman2Int( *pStart, &var );
        *pStart = (PCSTR)(-var);
    }
    Foo( ); // This will work very fast, because all strings
were processed in advance!
}
```

In this example, as this feature is generally available it can be safely relied upon.

Next, in another example, in order to provide further optimizations, text strings can be removed from the binary code and put into a special resource (e.g., without changes in the source file(s)).

For example, with the default configuration of BidApi.h, the following code fragment:

TABLE 9

```
// MySample.c(123):
BidTrace2A( "Hello, %s%c\n", "World", '!' );
BidTrace1A( "Bye %s.\n", szCityName );
``` is expanded by C/C++ preprocessor as follows (Build 1):

TABLE 10

```
if( _bidGblFlags & BID_APIGROUP_TRACE )
{
    __declspec(allocate("seg$2")) static PCSTR tcfs = "Hello,
%s%c\n";
    _bidTraceA(tcfs, "World", '!' );
}
if( _bidGblFlags & BID_APIGROUP_TRACE )
{
    __declspec(allocate("seg$2")) static PCSTR tcfs = "Bye %s.\n";
    _bidTraceA(tcfs, szCityName );
}
```

But if the _BID_PACK_STRINGS symbol is defined, the same code fragment will be expanded as shown below (Build 2):

TABLE 11

```
if( _bidGblFlags & BID_APIGROUP_TRACE )
{
    __declspec(allocate("seg$2")) static PCSTR tcfs = NULL;
    _bidTraceA( &srcInfo, tcfs, "World", '!' );
}
if( _bidGblFlags & BID_APIGROUP_TRACE )
{
    __declspec(allocate("seg$2")) static PCSTR tcfs = NULL;
    _bidTraceA( &srcInfo, tcfs, szCityName );
}
```

Since the sources are not generally touched, the list of local static pointers doesn't change when the code is recompiled with the _BID_PACK_STRINGS symbol defined. Therefore, in Build 2 exactly the same access table is obtained, but actual strings are gone.

For example, a special version of the diagnostics subsystem (e.g., Build Helper) can run against Build 1 to go through access table, collects the strings and creates a binary (e.g., maybe compressed and/or encrypted) resource. The Build 2 with incorporated resource can be the "final" module.

When such "final" module gets connected to the diagnostic subsystem, the implementation of the DllBidEntryPoint function can go through the access table and put indexes to associate each slot in the table with the string, which was referred by an associated slot in Build 1, but now locates in the resource.

Namespace Aliases

In one example, in order to reduce the space used by trace-point strings, full namespace names can be replaced with shorter aliases. For example:

TABLE 12

| Component | Alias | Full expansion |
| --- | --- | --- |
| SqlClient managed provider | sc | System.Data.SqlClient |
| SqlServer in-proc managed provider | ss | System.Data.SqlServer |

TABLE 12-continued

| Component | Alias | Full expansion |
|---|---|---|
| OleDb managed provider | oledb | System.Data.OleDb.OleDb |
| Odbc managed provider | odbc | System.Data.Odbc.Odbc |
| Oracle managed provider | ora | System.Data.OracleClient |
| ObjectSpace | obj | System.Data.ObjectSpaces |
| DataSet/DataTable/Data | ds | System.Data |
| DbTable | dbt | System.Data.Common.DbTable |
| Common code | comn | System.Data.Common |
| Provider base implementation classes | prov | System.Data.ProviderBase |

Categories

Additionally, categories can be included as keywords in the trace-control string. In one example, valid categories for managed tracing are:

TABLE 13

| Category | Description |
|---|---|
| API | Public API (method, property) is called |
| API\|OLEDB | Code calls OLEDB component |
| API\|ODBC | Code calls ODBC API |
| API\|SNI | Code calls SNI |
| API\|OCI | Code calls OCI |
| API\|SYS | Code calls an OS (e.g., Win32) function |
| ERR | Error |
| WARN | Warning |
| INFO | Information |
| RET | Return value, usually in the form of API\|RET or for external components such as OCI API\|OCI\|RET |
| THROW | An new exception is being thrown (not applicable to exceptions being re-thrown) |
| CATCH | If the code catches an exception. This is especially important if the code destroys (e.g., eats) the exception. |
| LIFETIME | Lifetime-related activity, such as AddRef/Release for COM objects |
| RES | Resources in general |
| RES\|MEM | Memory allocation/free |
| RES\|CPOOL | Connection pool activities (grab a connection from the pool, return connection to the pool, internal pool implementation, etc.) |
| ADV | For trace-points that are wrapped in an if(Bid.AdvancedOn) { ... } statement |

Trace-points and String Formats

Method and Property Enter/Leave (Scope Tracking)

In one example, Bid.ScopeEnter and Bid.ScopeLeave are employed to trace a method call, parameters and method exit afterwards. For example:

TABLE 14

```
Class Foo
{
  void Bar( int i, string s )
  {
    IntPtr hscp=Bid.NoData;
    try {
      Bid.ScopeEnter( out hscp,
        "<alias.Foo.Bar|API> %d#, i=%d,s=%s\n",
        ObjectID, i, s );
      // method body
    }
    finally {
```

TABLE 14-continued

```
      Bid.ScopeLeave( ref hscp );
    }
  }
}
```

For example, Bid.ScopeEnter can be formatted as:

TABLE 15

<namespace.classname.methodname|API> %d#, param1=%i, param2='%s'\n or

<alias.classname.methodname|API> %d#, param1=%i, param2='%s'\n

In this example:
Use of alias is preferred to namespace;
For properties, use get_PropName, set_PropName;
Don't generally include parameter names for properties;
There is a space between ">" and the first "%", as well as after each ",");
The first argument, % d# is used to pass "this". For example, static methods should not include it;
Parameter names should be listed (e.g., exactly) as the actual parameter name, including case;
If the method has a return value, the "RET" category can be used in a trace-point with Bid.Trace; and/or,
If a method is designated for tracing, then substantially all the implementations in base and derived classes should be traced.

In another example, trace-point(s) are not placed in performance critical methods.

Trivial Property Getters/Setters

There are many cases where a property getter/setter only copies a value from the parameter to a member variable or returns a member variable value. In one example, in those cases, if no other method is called and the property doesn't throw exceptions, then a single trace-point can be used instead of scoping.

For example, for the getter, the trace-point can include the value being returned:

TABLE 16

Bid.Trace("<sc.SqlCommand.get_CommandText|API> %d#, '%s'\n", ObjectID,_commandText);

For the setter, the new value being set can be traced:

TABLE 17

Bid.Trace("<sc.SqlCommand.set_CommandText|API> %d#, '%s'\n", ObjectID, value);

Exceptions

Serious errors and cause an exception to be thrown are traced indicating THROW as the trace type, as shown below:

TABLE 18

```
// do something that may fail, for example, open a connection
if(open_failed) {
```

TABLE 18-continued

```
Bid.Trace( "<sc.SqlConnection.Open|THROW> '%s'\n", msg);
throw new Exception(msg);
}
```

Layer Transitions

In one example, every time a component calls into another component in a different layer (e.g., from SqlClient into SNI) the call is traced. After the call is done, the return value is also traced. For example:

TABLE 19

```
Bid.Trace("<sc.SqlConection.Open|API|SNI> SNIOpen, '%s'\n",
    serverName);
// call to SNI
res = SNIOpen(serverName);
Bid.Trace("<sc.SqlConnection.Open|API|SNI|RET> SNIOpen, %lx\n",
res);
```

Other Trace Messages

Optionally, there are some specific places where it can be beneficial to have trace point(s), even when they are not in a specific category or boundary. For example, these trace messages can also simply use the Bid.Trace method to log entries:

TABLE 20

```
Bid.Trace( "<sc.SqlConnection.Open|INFO> Enlisting in DTC\n");
```

Pluggable Trace Component(s) 120

As noted previously, the BID framework also defines the binary protocol for trace component(s) 120 (e.g., trace-library(ies)) to be hooked into the component(s) to be traced. The trace component(s) 120 can accordingly be viewed as "pluggable" since the application 110 instrumented to support BID can be employed with any suitable trace component(s) 120.

Trace Component(s) 120

The trace component(s) 120 can be pluggable, for example, to facilitate extensibility and/or adaptability of the system 100. For example, a specialized team (e.g., PSS team) can desire to replace a standard trace component 120 with a specialized trace component 120.

In one example, the managed diagnostics implementation can be based on the default BID trace component 120 (e.g., default BID library). This component 120 can provide both native and managed APIs for tracing and performance monitoring with minimal overhead and great flexibility. The component 120 can provide services such as trace string pre-processing and/or scope (method entry/exit) tracking.

As the BID framework employs pluggable trace component(s) 120 (e.g., tracing library(ies)), the BID framework itself doesn't perform any tracing and/or logging. The BID framework provides the infrastructure discussed previously, and, a trace component 120 loader, as discussed below. Accordingly, custom trace component(s) 120 (e.g., custom tracing library(ies)) can be developed, for example, for specific circumstances.

Exemplary Default BID Trace Component 120

In one example, the default BID trace component 120 (e.g., tracing library) provided with the data access stack sends trace entries to an Event Tracing API. The Event Tracing API can also automatically propagate relevant events so software management tools can be notified.

System.Diagnostics.Trace→BID

In one example, by providing a NET trace listener that sends its output to BID, other components can be integrated to the BID tracing infrastructure. Generally, trace from non-BID-aware objects will not contain as much information as BID-aware components do, but at least users will have a single trace for the whole application.

Configuration

Enabling Tracing

In one example, tracing is disabled by default in the data access stack. Further, in another example, the BID functionality for both native and managed components is enabled and configured using registry keys (e.g., which can be manipulated by a setup program or a control panel applet). Thus, in this example, tracing across the entire data access stack can be enabled from a single place. Those skilled in the art will recognize that other scenarios, such as the use of a System.Diagnostics.Trace→BID trace listener, discussed previously, can require additional configuration.

APIs

In one example, the BID framework provides application program interface(s) (APIs) that enables developer(s) to place the actual trace-points. For example, these APIs can be available for both native (e.g., unmanaged) and/or managed code, in the form of macro(s) and class(es), respectively. The trace-point(s) indicate, for example, when to trace and/or what to trace (e.g., function entry/exit, parameters, internal activity, resource allocation), as well as general purpose control information. In this example, the trace-point(s) do not generally include information on how to trace (e.g., no tracing-facility-specific information is embedded in the code.)

The BID framework can be employed as a unified tracing API. For example, the BID framework can facilitate employment of different tracing libraries to which a particular trace output is routed. As noted, there can be native and managed versions of the BID framework which can facilitate mixed-mode tracing.

In one example, the overall API is designed to favor performance (e.g., even at the cost of sacrificing ease of use in some scenarios).

Dynamic Binding to Trace Component 120

Figure 3:
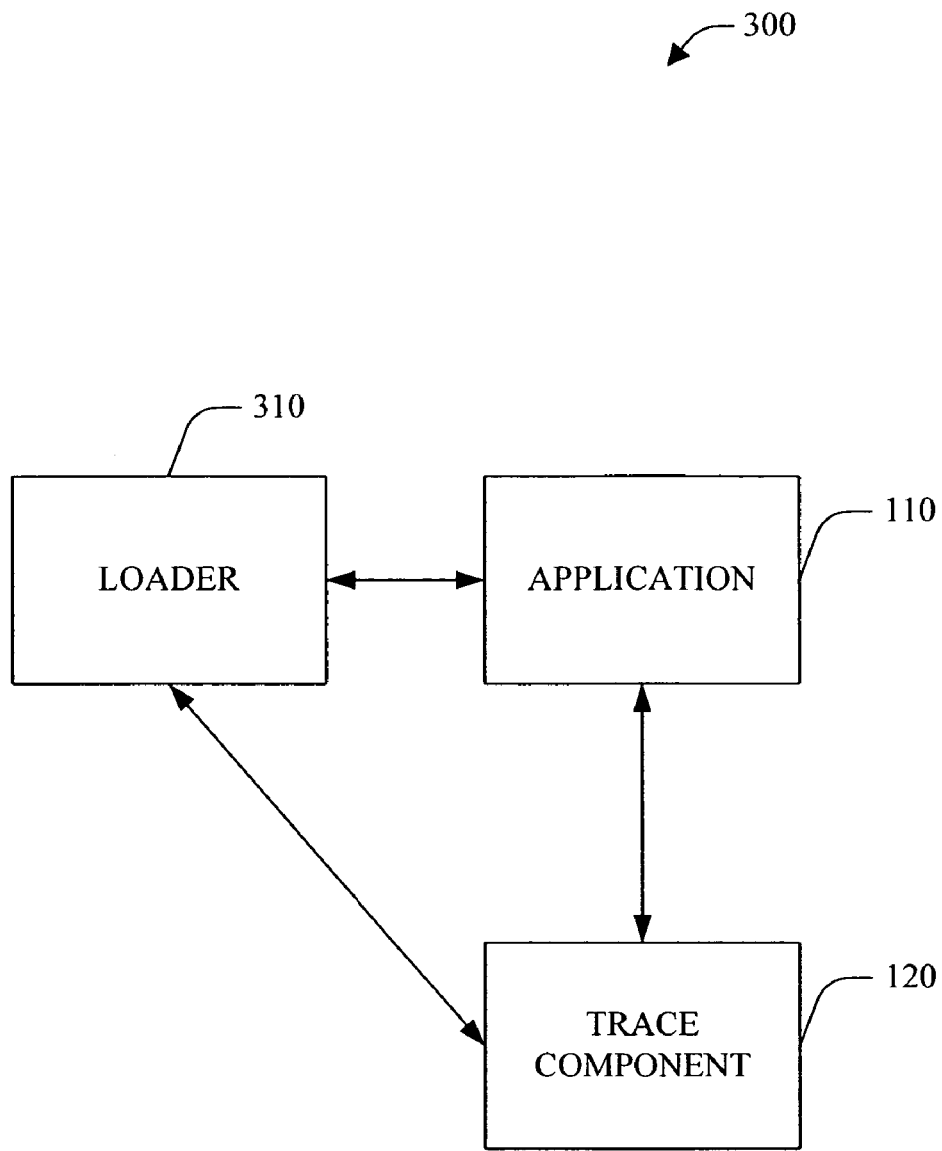
FIG. 3 is a block diagram of a diagnostics support system in accordance with an aspect of the present invention.

Referring briefly to FIG. 3, a diagnostic support system 300 in accordance with an aspect of the present invention is illustrated. The system 300 includes an application 110, a trace component 120 and a loader 310.

The BID framework provides the means to include trace-points in code and to bind the instrumented binaries to trace component(s) 120 (e.g., trace-library) dynamically (e.g., based on configuration). The trace component(s) 120 (e.g., trace library(ies)) include the actual tracing code, or glue code to bridge to an external tracing facility (not shown) (e.g., bridge to Event Tracing for Windows® (ETW)).

The loader 310 dynamically loads trace component(s) 120 and orderly attaches and/or detaches process(es) of the application 110.

Dependencies

The BID framework is designed to add no dependencies to the caller components. Thus, the BID code is embedded into the component itself.

The trace component(s) 120 (e.g., BID libraries) can be configured on the target computer. In one example, if no trace component 120 has been configured or available, the application will just run normally (e.g., with tracing disabled).

Post-filtering

The BID framework is designed so the overhead built into the code by the trace-point(s) is minimized. Thus, post-filtering and/or processing is generally performed by the trace component(s) 120 (e.g., actual tracing library being used). For example, the trace component(s) 120 can selectively perform post-filtering and/or processing based, for example, upon goal(s) of the trace component(s) 120 (e.g., performance versus richness).

As discussed previously, the design of the BID framework can facilitate a number of optimizations to pre-process the trace-points contained in a given binary to selectively enable/disable individual trace-points, and/or to strip out the trace-point text information from the binary. Thus, the trace component 120 that can selectively employ none, some and/or substantially all of the trace point(s) associated with the application 110.

Filtering can be based, for example, upon:

Flag(s) (e.g., on/off);

Connection-time processing (e.g., text string tables, as discussed previously); and/or Scoping (e.g., context specific information describing state).

Security

In one example, when tracing is enabled, a detailed log of the provider activity can be generated which has two side effects:

The log can potentially contain sensitive information; and/or

Enabling all tracing options in stressed sites (e.g., 7 days× 24 hours) can cause a performance problem. Additionally, excessive tracing can result in filling of associated storage media due to the log files.

Thus, in one example, the ability to configure who can enable tracing requires administrative privileges by default. In another example, instrumentation can be enabled in production environments since it is not expected to generate an excessively large extra load on the system.

Exemplary Scenarios

Troubleshooting

In this example, a database-enabled application is not behaving as expected, and the first analysis shows that the data access stack might be the cause. In accordance with an aspect of the present invention, in order to determine exactly what's going on within the data access stack (including the database-specific provider), the BID framework tracing support is enabled in the target computer, and the application is exercised so as to produce the unexpected behavior. The newly generated log can be analyzed in real-time as it comes, or can be written to a log file for off-line analysis.

Advanced Troubleshooting

In this example, a database-enabled application is not behaving as expected, and the first analysis shows that the data access stack might be the cause. In accordance with an aspect of the present invention, a Product Support Services (PSS) team needs to find out where and/or what exactly the problem is.

Since this is a non-typical scenario, the PSS team can employ a special tracing component 120 (e.g., a special tracing library) and/or develops a new one for this particular problem. Thus, the PSS team can couple the trace component 120 (e.g., tracing library) to the application using the BID framework associated with the application. Then the application can be run and the output from the tracing component 120 (e.g., tracing library) can be employed to understand the cause of the problematic behavior.

It is to be appreciated that the system 100, the application 110 and/or the trace component(s) 120 can be computer components as that term is defined herein.

Figure 4:
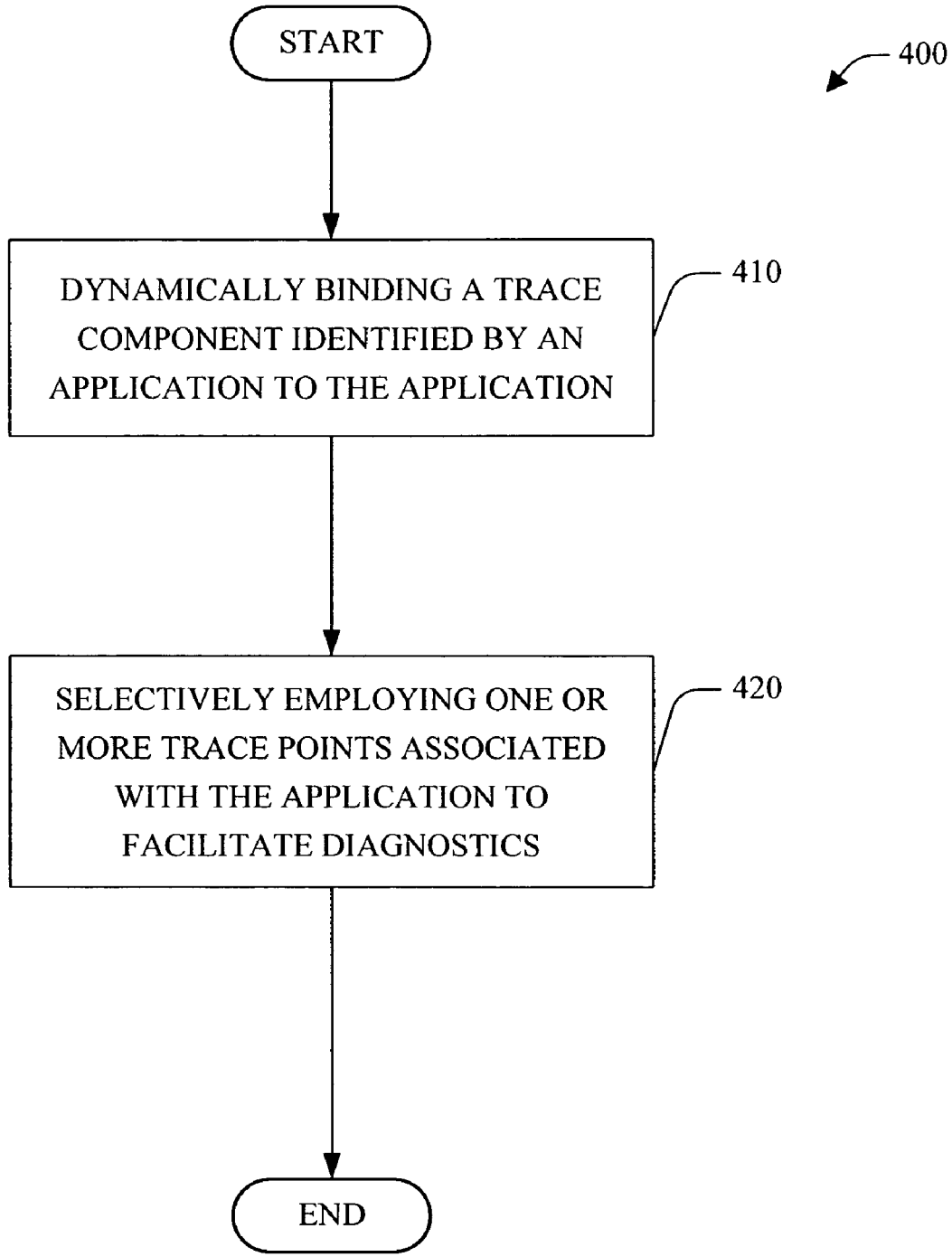
FIG. 4 is a flow chart of a method facilitating diagnostic support in accordance with an aspect of the present invention.

Turning briefly to FIG. 4, a methodology that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method 400 facilitating diagnostic support in accordance with an aspect of the present invention is illustrated. At 410, a trace component (e.g., tracing library) is dynamically bound to an application—with the application identifying the component. At 420, one or more trace points associated with the application are selectively employed (e.g., by the trace component) to facilitate diagnostics.

Figure 5:
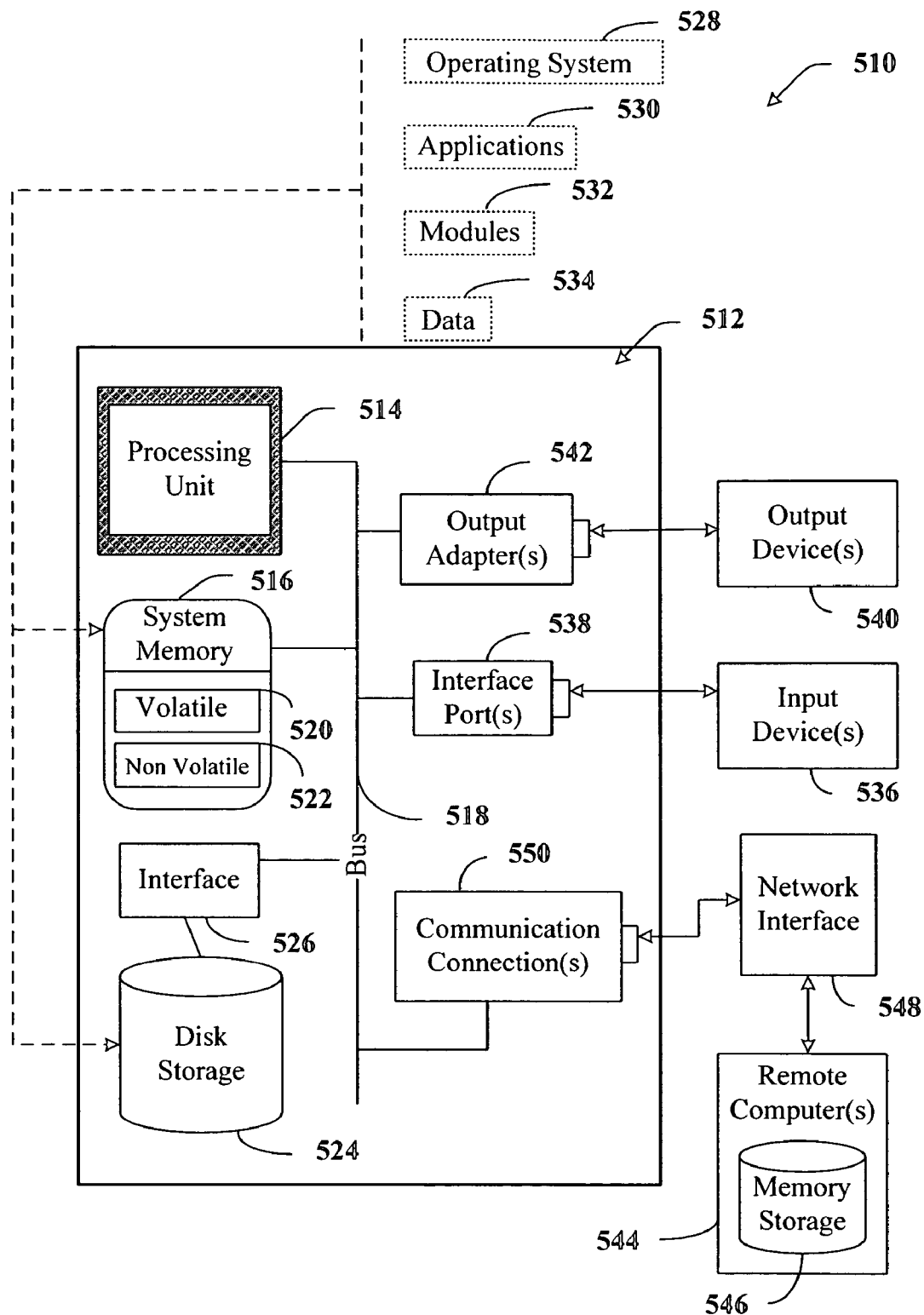
FIG. 5 illustrates an example operating environment in which the present invention may function.

In order to provide additional context for various aspects of the present invention, FIG. 5 and the following discussion are intended to provide a brief, general description of a suitable operating environment 510 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 5, an exemplary environment 510 for implementing various aspects of the invention includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/nonremovable, volatile/nonvolatile computer storage media. FIG. 5 illustrates, for example a disk storage 524. Disk storage 524 includes, but is not limited to, devices like a magnetic disk drive, floppy disk drive, tape drive, Jaz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the present invention can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system for facilitating diagnostic support comprising:
   a processor; and
   memory storing a diagnostics framework, the diagnostics framework comprising:
      an instrumentation framework that exposes an application program interface through which trace points are embedded into source code of an application, each trace point, when executed, exposing information regarding state or behavior of the application, each trace point further including information which specifies a trace component to which the trace point is to be dynamically bound such that the state or behavior exposed by the trace point is sent to the bound trace component upon execution of the trace point such that tracing is performed by the bound trace component rather than the instrumentation framework, wherein each bound trace component is a component running on the computer system that is separate from the application;

one or more trace components that each include code that performs tracing based on state or behavior received from each embedded trace points to which the trace component is bound; and an infrastructure for dynamically loading, at run time of the application, the one or more trace components that are specified by the trace points in the application such that upon executing each trace point in the application, the corresponding state or behavior of the application exposed by the trace point is sent to the bound trace component for evaluation.

2. The system of claim 1 wherein each trace point is formatted according to a "printf" style format string.

3. The system of claim 1 wherein one of the trace components comprises glue code for bridging to an external tracing facility such as Event Tracing for Windows.

4. The system of claim 1 wherein one of the trace components includes both native and managed APIs for performing trace string pre-processing, post filtering, or scope tracking.

5. The system of claim 4 wherein the pre-processing comprises one or more of selectively enabling individual trace points, or stripping out text information in a trace point.

6. The system of claim 1 further comprising configuration information that specifies whether trace points are to be executed during the execution of the application.

7. The system of claim 6 wherein the configuration information is stored in the registry of the operating system.

8. A computer storage media storing a diagnostics framework which when executed by a processor facilitates diagnostic support, the diagnostics framework comprising:

an instrumentation framework that exposes an application program interface through which trace points are embedded into source code of an application, each trace point, when executed, exposing information regarding state or behavior of the application, each trace point further including information which specifies a trace component to which the trace point is to be dynamically bound such that the state or behavior exposed by the trace point is sent to the bound trace component upon execution of the trace point such that tracing is performed by the bound trace component rather than the instrumentation framework, wherein each bound trace component is a component running on the computer system that is separate from the application;

one or more trace components that each include code that performs tracing based on state or behavior received from each embedded trace points to which the trace component is bound; and an infrastructure for dynamically loading, at run time of the application, the one or more trace components that are specified by the trace points in the application such that upon executing each trace point in the application, the corresponding state or behavior of the application exposed by the trace point is sent to the bound trace component for evaluation.

9. The computer storage medium of claim 8 wherein each trace point is formatted according to a "printf" style format string.

10. The computer storage medium of claim 8 wherein one of the trace components comprises glue code for bridging to an external tracing facility such as Event Tracing for Windows.

11. The computer storage medium of claim 8 wherein one of the trace components includes both native and managed APIs for performing trace string pre-processing, post filtering, or scope tracking.

12. The computer storage medium of claim 11 wherein the pre-processing comprises one or more of selectively enabling individual trace points, or stripping out text information in a trace point.

13. The computer storage medium of claim 8 further comprising configuration information that specifies whether trace points are to be executed during the execution of the application.

14. The computer storage medium of claim 13 wherein the configuration information is stored in the registry of the operating system.

* * * * *